United States Patent [19]

Zbinden

[11] 4,393,921
[45] Jul. 19, 1983

[54] CIRCUIT CONTROLLING COOLANT FLOW TO A NON-LINEAR HEAT EXCHANGER THROUGH A NON-LINEAR ELECTROMECHANICAL VALVE

[75] Inventor: Terry B. Zbinden, Maple Grove, Minn.

[73] Assignee: Sperry Corporation, New York, N.Y.

[21] Appl. No.: 397,954

[22] Filed: Sep. 13, 1982

[51] Int. Cl.³ ............................................... G05D 15/00
[52] U.S. Cl. .................................. 165/40; 236/78 C; 251/131; 318/615
[58] Field of Search .............. 236/78 C, 78 D, 75; 251/133, 131; 318/615; 165/40

[56] References Cited

U.S. PATENT DOCUMENTS 2,234,913  3/1941  Haines ............................. 236/78 C
3,391,317  7/1968  Bell ................................. 236/78 C
3,778,025  12/1973 Lane et al. ....................... 236/78 D Primary Examiner—William E. Wayner
Attorney, Agent, or Firm—William C. Fuess; Kenneth T. Grace; Marshall M. Truex

[57] ABSTRACT

An electronic circuit controls a non-linear electromechanical valve in order that the temperature of approximately 25 gallons of coolant water within a reservoir may be maintained within +2.8° C. to −0.0° C. of a set point temperature from 35° F. to 100° F. The valve regulates circulation of such coolant within a secondary cooling loop incorporating a non-linear heat exchanger for thermal exchange with building water flowing from 20 to 30 gallons per minute. The reservoir coolant water is subject to an essentially instantaneously variable thermal load of 0 to 20 kilowatts due to circulation through logic modules in a primary coolant loop. The electromechanical valve control circuit receives an external set point temperature signal, and a reservoir coolant temperature signal which is offset in conversion from degrees Kelvin to degrees Centigrade. The electromechanical valve control circuit employs a first feedback signal from a position potentiometer mechanically linked to valve position, which signal is compensated in a breakpoint amplifier to account for valve and heat exchanger non-linearities in the secondary cooling loop. A second feedback signal from a tachometer, mechanically linked to a motor driving the valve through a 1000:1 gear reduction, is utilized to impart circuit stability.

5 Claims, 8 Drawing Figures

CIRCUIT CONTROLLING COOLANT FLOW TO A NON-LINEAR HEAT EXCHANGER THROUGH A NON-LINEAR ELECTROMECHANICAL VALVE

BACKGROUND OF THE INVENTION

The present invention relates generally to an electronic circuit for close temperature regulation over a wide thermal range by controlling coolant flow to a non-linear heat exchanger through control of a non-linear electromechanical valve. The present invention relates specifically to a control circuit for a non-linear electromechanical valve so that water coolant flow within a secondary coolant loop may be regulated through a non-linear heat exchanger of such secondary coolant loop in order that water coolant within a reservoir also circulated in a primary coolant loop to water cool computer modules collectively dissipating from 0 kilowatts (all off) to 28 kilowatts (all on) may be temperature regulated in the face of such varying thermal load to a uniformity of approximately ±1° C. The goal of the circuit of the present invention is not so much that a single unique and invariant temperature should be perpetually controllably fixedly maintained, but rather that a very uniform temperature regulation on a time scale of hours should be maintainable within an extremely non-linear system incurring extreme and essentially instantaneous variations in thermal load and ambient temperature.

The general environment in which the circuit of the present invention operates and a prior art circuit for accomplishing the regulation of coolant flow through control of an electromechanical valve is shown in FIG. 1. The LOGIC MODULES are water cooled logic assemblies within a digital computer collectively dissipating from 0 to 10's of kilowatts. The heat from the logic gates within the logic modules will be transferred to an aluminum cold plate with water channels machined inside it. The cooling water is pumped by PUMP 2 through the LOGIC MODULES into the RESERVOIR, and back into the LOGIC MODULES as a PRIMARY COOLANT LOOP. Water from the RESERVOIR is also pumped through a HEAT EXCHANGER and regulated ELECTROMECHANICAL VALVE by PUMP 1 as a SECONDARY COOLANT LOOP. The HEAT EXCHANGER transfers the heat from the water in the RESERVOIR, such as arises from the LOGIC MODULES, into the BUILDING WATER supply. The circuit of interest, the circuit of the present invention, is that circuit which controls the position of the motorized ELECTROMECHANICAL VALVE in this secondary cooling loop.

The system of cooling illustrated in FIG. 1 allows the LOGIC MODULES to operate warmer or cooler than the ambient air. Operation at warmer temperatures generally produces a lower mean-time-between-failure for electronic assemblies. Operating at too cool a temperature could mean condensation of the moisture from the air, which moisture could rapidly deteriorate the module epoxy glass dielectric. Ideally, then, the LOGIC MODULES should be cooled as near to the dew point of the ambient air as is possible.

Assuming that the dew point can be determined (one circuit for which is taught as part of the present disclosure), a control circuit is necessary to regulate the ELECTROMECHANICAL VALVE controlled coolant flow, and thus the thermal heat exchange, within the SECONDARY COOLANT LOOP in order that coolant within the RESERVOIR as circulates in the PRIMARY COOLANT LOOP will be maintained in temperature to be the same as the dew point temperature, plus a small increment to provide a margin of safety. The very simplest approach is to use an on-off solenoid ELECTROMECHANICAL VALVE, which is on when the RESERVOIR water temperature rises above an upper limit (such as dew point +5° C.) and off when the RESERVOIR water reaches dew point temperature. This control creates an oscillating temperature, such as is shown in FIG. 2. This temperature oscillation is not desirable for two reasons. First, because of the nature of this method, the more closely the temperature is regulated the more rapidly the solenoid ELECTROMECHANICAL VALVE must cycle. For a reasonable solenoid life a several degree hysteresis must be used. Such a resonable hysteresis raises the average peak temperature to 5° C. to 8° C. above the dew point (above, because the minimum point must be above or equal to the dew point temperature). Secondly, because some hysteresis is mandatory in on-off control of a solenoid valve, the slight resulting oscillation in temperature strains mechanical joints, such as the soldered dies upon the LOGIC MODULES, more than is desirable.

A superior prior art approach to control of the ELECTROMECHANICAL VALVE is a proportional linear circuit. The control circuit illustrated in FIG. 1 is such a simplified representation of a proportional linear circuit. A voltage corresponding to the desired temperature is applied as signal TEMP. REF. as a reference input to error amplifier AMP. A1. The signal output of a thermometer or thermistor, submerged in the water of the RESERVOIR to be regulated, is applied (as a voltage) to the error signal input of the amplifier AMP. A1. The difference signal is amplified and used to drive a d.c. MOTOR M attached to the VALVE V (which form the ELECTROMECHANICAL VALVE) in the correct direction. If the temperature of the water within the RESERVOIR is hotter than desired, the ELECTROMECHANICAL VALVE opens, allowing more water to flow through the HEAT EXCHANGER and therefore transferring more heat to the BUILDING WATER supply. If the temperature of the water within the RESERVOIR is too cold, the ELECTROMECHANICAL VALVE closes more, reducing the water flow and reducing the heat transfer within the HEAT EXCHANGER to the BUILDING WATER SUPPLY.

The prior art system shown in FIG. 1 with a water RESERVOIR, pipes, pumps and other elements such as cold plates on the LOGIC MODULES, has a thermal inertia, and temperature cannot be changed instantaneously. When the error amplifier AMP A1 senses a difference from the set point, and responsively changes the power to the MOTOR M of the ELECTROMECHANICAL VALVE, there is a time lag of up to several seconds before the temperature sensor in the RESERVOIR determines that any change in cooling has occurred. If the gain of the system composed of the temperature sensor, the proportional linear regulator circuit and the electromechanical valve is too high, then the ELECTROMECHANICAL VALVE will open (or close) too far for the actual change in heat load, and temperature overshoot will occur. For very high systems gains, instability or oscillation can result. The system gain is the amount that the position of the ELECTROMECHANICAL VALVE changes relative to the change in the thermometer or thermistor temperature sensor.

Several prior art methods of stopping oscillation in a proportional linear regulated system with high gain are available. Such oscillation as occurs yields a result similar to the temperature variation occurring from the usage of a solenoid, or on-off type, control as illustrated in FIG. 2. A first approach lowers the system gain, or closed loop gain, until stability is achieved. This approach usually yields the result that the temperature reached, or the temperature difference from the set point is unacceptably large. Another prior art approach is to use an anticipator to predict the system response and thusly slow the change in position of the ELECTROMECHANICAL VALVE relative to the anticipated response of the thermal system. A good example of this approach is a household thermostat. The bimetalic spring which senses temperature in such a thermostat is much slower to respond to temperature changes than the air around it. If no anticipator were used, wide home air temperature changes, as much as 5° F. to 10° F. would be seen, disrupting comfort. When installed, a heater is adjusted inside the thermostat which adds heat locally to the thermostat in order to cause it to warm up as fast as the ambient air does. Such a heater anticipates the air change based on the known house and furnace characteristics. This implementation of an anticipator does not work for a complex thermal system with many variable heat input rates, for example LOGIC MODULES producing from 0 to 14 kilowatts each. It should be additionally assumed within the system of FIG. 1 that the coolant BUILDING WATER into the HEAT EXCHANGER may vary in temperature from 35° F. to 55° F., and also vary in flow rate (pressure) from 20 to 30 gallons per minute. Additionally, two sets of LOGIC MODULES might be cooled from the same RESERVOIR (thusly up to 28 kilowatts total thermal load).

First, and even second order, differentiator type control circuits as are present in the prior art do not form the basis for the circuit of the present invention. Besides the aforementioned extreme variations in the supply coolant BUILDING WATER, and the wide variation in the thermal load from 0 to 28 kilowatts, it should be realized that the HEAT EXCHANGER and the ELECTROMAGNETIC VALVE are extremely non-linear. Non-linearity in the HEAT EXCHANGER means that thermal heat transfer is not linear with either coolant temperature or coolant flow. Non-linearity in the ELECTROMECHANICAL VALVE means that neither fluid flow in the secondary loop (nor resultant temperature in the RESERVOIR) is linear with the valve position. The mathematical model for these several non-linearities, should such be capable of construction, would require very complex electronics for a differentiator type control circuit which would allow close temperature regulation over a wide range of variable thermal load (0 to 28 kilowatts), and a variable thermal exchange media of BUILDING WATER (35° F. to 55° F. at differing flow rates and pressures).

SUMMARY OF THE INVENTION

The present invention is a control circuit for controlling coolant flow to a non-linear heat exchanger through, and via regulation of, a non-linear electromechanical valve in order that close temperature regulation of coolant within a reservoir may be maintained over a wide range of thermal exchange conditions for cooling such coolant, and over a wide range of thermal loads upon such coolant. The coolant within the reservoir is circulated in a secondary coolant loop for heat exchange in a non-linear heat exchanger with an external thermal sink (source). The coolant flow within this secondary coolant loop, and thus the coolant temperature within the reservoir, is regulated by a non-linear electromechanical valve.

The electromechanical valve control circuit of the present invention utilizes one only external signal, a voltage which represents the set point temperature in degrees Centigrade. The purpose of the circuit is to control the electromechanical valve so that the temperature of the coolant within the reservoir is held as close as possible, but never below, this input set point temperature reference value. The circuit of the present invention utilizes, in combination, the sensing of up to three conditions in the control of the electromechanical valve. A first sensed condition, as is common in the prior art, is the temperature of the coolant within the reservoir as sensed by a temperature sensor/transducer. A second sensing of the electromechanical valve position is performed by a position potentiometer. In order to compensate for the non-linear response of both the electromechanical valve and the heat exchanger (within the coolant flow of the secondary coolant loop which the electromechanical valve controls) a non-linear compensating circuit in the form of a breakpoint amplifier is utilized to approximately linearize the thermal response of the secondary coolant loop relative to the position of the electromechanical valve as sensed by the position potentiometer. The third quantity sensed is the velocity of the electromechanical valve, which velocity is sensed within a tachometer which is mechanically linked to the motor which connects to the electromechanical valve and the position potentiometer through a gear reducer. The signal derived from the tachometer is utilized in the control circuit to impart stability (prevention of rapid opening and closing of the electromechanical valve) to the control circuit, such as is primarily responsive to the valve position potentiometer. Thusly, the electromechanical valve control circuit of the present invention utilizes the three sensed quantities of the reservoir coolant temperature, the electromechanical valve position, and the electromechanical valve speed in order to effectuate control of coolant flow within a secondary coolant loop so that the temperature of such coolant within a reservoir, such temperature as is influenced by the thermal load upon such coolant occurring within a primary loop, may be maintained at a substantially constant and invariant value. Such substantially constant and invariant temperature will be at, or slightly above, a set point reference temperature value.

The quantitative performance of the circuit of the present invention has been assessed for a system wherein 39 to 55 total gallons of coolant water are contained within the entire system. The reservoir contains approximately 25 gallons of coolant water. The logic modules each contain two to three gallons, dependent upon the type, of coolant water. The interconnective piping, which may vary in the primary coolant loop from 15 feet to 60 feet, contains approximately 2 gallons of coolant water per foot. The remaining system coolant is utilized in the secondary coolant loop. When the parameter of total thermal heat load arising within the logic modules is varied from 0 kilowatts to 20 kilowatts, the parameter of reservoir set point temperature is varied from 35° F. to 100° F., and the parameter of the flow rate of the external building water supply is varied from a minimum flow of 20 gallons per minute to a maximum flow of 30 gallons per minute, the measured worse case change in the coolant water temperature of the reservoir is 2.8° C. A typical temperature change in the reservoir water coolant responsive to the switching on of a 14 kilowatt thermal load in the primary coolant loop, during the presence of normal external building water flow of 30 gallons per minute through the heat exchanger of the secondary coolant loop, is less than 1° C.

Correspondingly, it is a first object of the present invention that the position of a non-linear electromechanical valve should be sensed, compensated in accordance with the non-linear characteristics of the electromechanical valve and a heat exchanger within the coolant loop controlled by such valve, and utilized by a control circuit to effectuate positional control of such electromechanical valve for the purpose of maintaining the temperature of a coolant, circulated in a secondary coolant loop through the heat exchanger and the electromechanical valve, in a reservoir at a constant temperature.

It is a second purpose of the electromechanical valve circuit of the present invention that the speed of positional location of such electromechanical valve should be sensed via tachometer means and utilized by the positional control circuit of such electromechanical valve in order to effectuate such smooth and even position of such electromechanical valve as results in the constant temperature of a coolant, such coolant circulated within a secondary coolant loop controlled by such electromechanical valve, as is collected in a reservoir.

It is a third object of the present invention that the set point temperature externally received by the control circuit of the electromechanical valve should be variable over a broad range, nominally, 35° F. to 100° F. When such externally supplied set point temperature to the control circuit of the present invention is varied in realization of this third object, it is the continuing object of the control circuit for the electromechanical valve that the temperature of coolant within a reservoir should be maintained essentially constant (nominally within +2.8° C.) even though the thermal load upon such coolant should vary greatly (0 kilowatts to 28 kilowatts) essentially instantaneously (turned-on, turned-off) while the secondary coolant loop means of extracting (adding) thermal energy to such coolant is also subject to variations in the thermal sink (source) (building water maximum full flowing or building water at minimum flow).

It is a fourth object of the present invention, a subsidiary object of the third object, that the control circuit of the electromechanical valve should accept wide ranging sources of set point temperature input. Accordingly, such set point temperature input to the electromechanical valve control circuit will be determined by one of two dew point monitors, by a manually settable trim pot, or alternatively by a high temperature limit in case a dew point monitor fails.

It is the summary object of the present invention that the temperature of a coolant within a reservoir should be maintained essentially constant through the positional control of an electromechanical valve located within the secondary coolant loop, even though such electromechanical valve and a heat exchanger within such secondary coolant loop are possessed of non-linearities, even though the thermal load upon such coolant may vary greatly, even though the thermal sink or source to which the energy of such coolant is exchanged (within such heat exchanger) may vary, and even though the externally specified set point temperature at which such coolant is to be constantly maintained should vary over a considerable range. In a general sense, the present control circuit is concerned with trying to effectuate the substantial temperature stability of a coolant utilized in a non-linear thermal environment, subject to massive perturbations in the thermal load (and, to a lesser extent, to perturbations in the thermal sink, or source, with which the energy of such thermal load needs be exchanged), and which coolant may be externally specified to be maintained at a set point temperature within a substantial range of such temperatures.

BRIEF DESCRIPTION OF THE DRAWINGS

FIG. 5b shows the response of the non-linear compensator, or break point amplifier, such as is utilized within the electromechanical valve control circuit of the present invention to approximately linearize the response diagrammed in FIG. 5a.

DESCRIPTION OF THE PREFERRED EMBODIMENT

Figure 1:
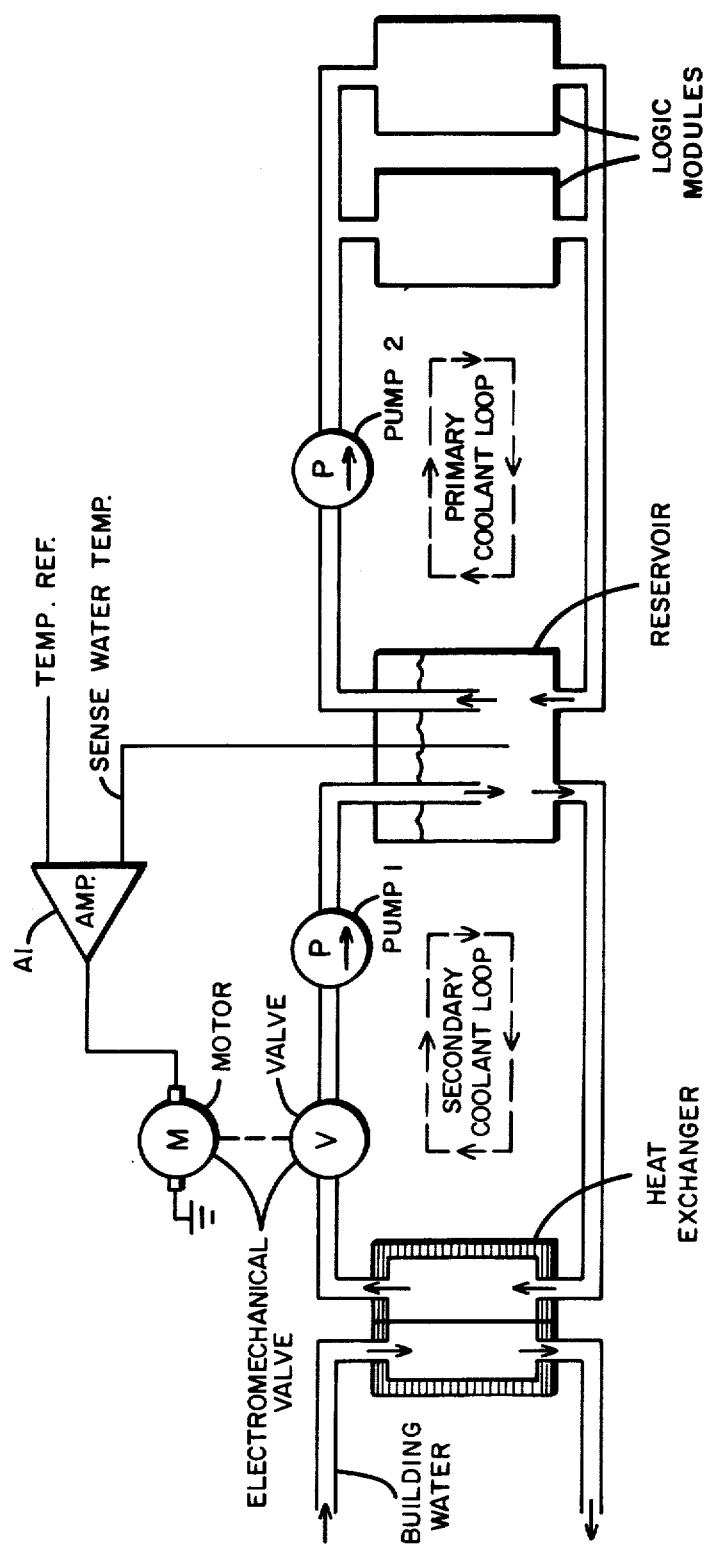
FIG. 1 shows a cooling system consisting of a primary coolant loop and a secondary coolant loop, and a prior art simplified linear regulator circuit for the control of an electromechanical valve within the secondary coolant loop of such cooling system.

The physical concepts of a cooling system in which the circuit of the present invention is used, and a prior art circuit for performing the purposes of the present invention, are illustrated in FIG. 1. A RESERVOIR of coolant, nominally water, is desired to be maintained at an even temperature so that when circulated in a PRIMARY COOLANT LOOP by PUMP 2 the temperature of the thermal sources (or sinks) LOGIC MODULES may also be maintained at an even value. Such LOGIC MODULES develop heat from logic elements, and thermal transfer is performed through such as an aluminum cold plate with water channels machined inside it. If such LOGIC MODULES are otherwise exposed to ambient air, the lowest temperature at which such LOGIC MODULES can be maintained without condensation, such as might adversely affect the epoxy dielectric and/or other electronic components upon such LOGIC MODULES, is slightly above the dew point. It is desired that the temperature should be maintained fairly close to such lowest practical dew point temperature because of the correlation of higher failure rates of electronic components with increased temperature. Thusly the even temperature of the LOGIC MODULES is not invariant, but may be established in consideration of the dew point ambient environment, possibly a slowly variant dynamic environment, in which the LOGIC MODULES are used. In the maintenance of such a lowest even temperature, the coolant within the RESERVOIR may serve to either cool the LOGIC MODULES through the PRIMARY COOLANT LOOP (the predominant mode), or to allow the heat created by the logic elements to raise the temperature of the LOGIC MODULES.

Of possibly greater importance than the maintenance of a lowest possible, slightly above dew point, temperature of the LOGIC MODULES shown in FIG. 1, it is desired that whatsoever temperature is established should not be subject to a rapidly changing large gradient. A large temperature gradient, meaning a large change in temperature for unit time, is particularly stressful and destructive of electronic components such as are mounted on the LOGIC MODULES because of the mechanical stresses so induced on connected materials which have different coeffients of expansion. If the LOGIC MODULES are switched on and off, such as may involve variations in power consumption and resultant thermal load of 0 to 10's kilowatts, then any reasonably finite amount of coolant stored within the RESERVOIR will be subjected to a rapidly variant thermal load. It is the purpose of the SECONDARY COOLANT LOOP to attempt to maintain the coolant within the RESERVOIR at an even constant temperature regardless of such rapidly variant thermal load which should be emplaced upon such coolant. The coolant within the RESERVOIR is cooled in the HEAT EXCHANGER by thermal exchange occurring with the thermal sink of BUILDING WATER. The rapidity and amount of thermal exchange of the RESERVOIR coolant occurring within this SECONDARY COOLANT LOOP is a function of the flow induced by PUMP 1 as modulated by the position of an ELECTROMECHANICAL VALVE. The ELECTROMECHANICAL VALVE opens to allow a greater thermal exchange and closes to reduce the magnitude of thermal exchange with the external thermal media of the BUILDING WATER.

Figure 2:
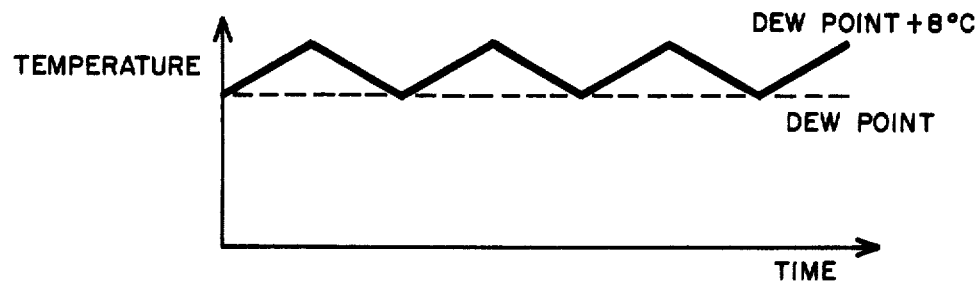
FIG. 2 shows a simplified representation of the temperature of the coolant within the reservoir of FIG. 1 which would be experienced across time if the electromechanical valve within the secondary coolant loop of FIG. 1 were an on-off solenoid type valve.

The prior art circuit for the control of the ELECTROMECHANICAL VALVE shown in FIG. 1 consists of a proportional linear circuit wherein the temperature of the coolant within the RESERVOIR is sensed by a thermometer or thermistor as signal SENSE WATER TEMP. and compared to a reference temperature signal TEMP. REF. The difference between the actual and the desired coolant temperature signals is amplified in AMP A1 and utilized to control the MOTOR M which is mechanically lined to the VALVE V of the ELECTROMECHANICAL VALVE. This prior art circuit cannot correctly differentiate the rate of temperature change of the coolant within the RESERVOIR because of the long delays between increased heat load and the resultant changes in temperature. A single anticipator circuit in prediction of system response does not work well in modification of the proportional linear regulator circuit shown in FIG. 1 if the coolant within the RESERVOIR is utilized within a complex system with many variable heat input rates. In other words, the thermal gradient that such RESERVOIR coolant experiences is not uniform, and no single anticipator circuit can compensate system response for all thermal gradients which are experienced. Furthermore, even a second order differentiator type control circuit modification to the proportional linear regulator circuit shown in FIG. 1 is difficult of construction, and of limited effectiveness, when the HEAT EXCHANGER and ELECTROMECHANICAL VALVE are, as is commonly the case, non-linear (linear electromechanical valves are available but costly). Non-linearity in the HEAT EXCHANGER means that the thermal transfer is not a linear function of the flow rate of coolant within the SECONDARY COOLANT LOOP. Non-linearity in the ELECTROMECHANICAL VALVE means that the coolant flow rate within the SECONDARY COOLANT LOOP, and the resultant thermal heat transfer, is not a linear function of the mechanical position of such ELECTROMECHANICAL VALVE. The manner by which said non-linearities will interact to influence the sensed temperature of the coolant within the RESERVOIR is complex of mathematical modeling, and complex of implementation as an electronic compensating circuit for modification of the proportional linear regulating circuit shown in FIG. 1. Forbearing that such sophisticated anticipation and/or compensation is applied to any regulator circuit which senses only the difference between the actual and desired temperature of the coolant within the RESERVOIR, an oscillation of temperature with time as illustrated in FIG. 2 will occur, especially as and when induced by thermal transients due to variation in either the thermal load emplaced upon the LOGIC MODULES within the PRIMARY COOLANT LOOP, a change in the ambient environment of such LOGIC MODULES, and/or a variation in the thermal transfer to the external BUILDING WATER thermal transfer media.

Figure 3:
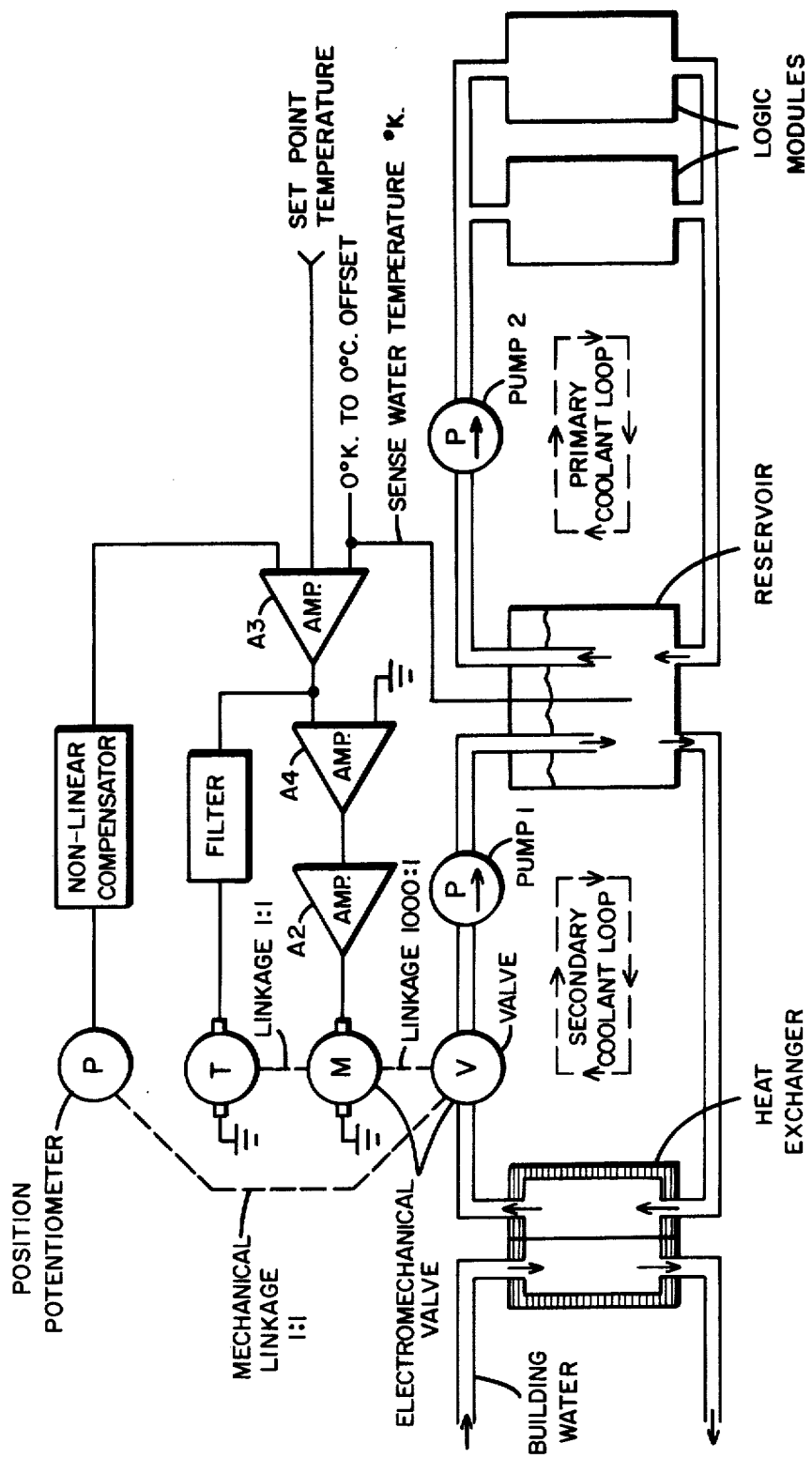
FIG. 3 shows a block diagram of the electromechanical valve control circuit of the present invention within the context of its utilization for the control of an electromechanical valve within the secondary coolant loop of a cooling system.

A block diagram of the circuit of the present invention in the context of its utilization for the control of an ELECTROMECHANICAL VALVE within a cooling system is shown in FIG. 3. The purpose of the circuit is to control a non-linear ELECTROMECHANICAL VALVE within a SECONDARY COOLANT LOOP, also incorporating a non-linear HEAT EXCHANGER, in order that coolant contained within a RESERVOIR, such coolant as is subject to essentially instantaneous large variations in thermal load, may be maintained at an even constant temperature through the control by such ELECTROMECHANICAL VALVE of coolant flow, and resultant thermal exchange, within such SECONDARY COOLANT LOOP. In order to accomplish this purpose of maintaining the RESERVOIR coolant at an even temperature, the ELECTROMECHANICAL VALVE control circuit of the present invention utilizes three physical quantities which are sensed and converted to electrical quantities for system feedback paths, as well as an external signal input of that temperature which is desired to be evenly maintained (called a SET POINT TEMPERATURE). A first physical quantity sensed is the temperature of the coolant within the RESERVOIR, such as read by a thermometer or electronic sensor/transducer which is old in the art. A second physical quantity sensed, via a POSITION POTENTIOMETER, is the opening or closing position of the ELECTROMECHANICAL VALVE. A third physical quantity sensed via a TACHOMETER is the rate of change in the position of the ELECTROMECHANICAL VALVE.

Commencing with the detailed explanation of the block diagram of the present circuit for control of an ELECTROMECHANICAL VALVE as shown in FIG. 3, the single external signal input to this control circuit is a voltage called SET POINT TEMPERATURE which represents the desired set point temperature in degrees Centigrade. The development of this signal SET POINT TEMPERATURE may be made from one of several signal sources as will be shown within the circuit of FIG. 6. The circuit of the present invention will respond to position the ELECTROMECHANICAL VALVE so that the temperature of the coolant within the RESERVOIR will be held as close as possible to the value established by the SET POINT TEMPERATURE signal while not going below this value nor rising too far above this value.

Continuing in FIG. 3, the VALVE V is positioned by, and mechanically linked to, the MOTOR M portion of the ELECTROMECHANICAL VALVE by a 1000 to 1 geared speed reducer. Also directly (1 to 1) mechanically linked to the ELECTROMECHANICAL VALVE is the POSITION POTENTIOMETER. The TACHOMETER is directly (1 to 1) mechanically linked to the shaft of the MOTOR M. The signal output of amplifier AMP. A4 is amplified to a higher current by amplifier AMP. A2 to drive the d.c. MOTOR M. The MOTOR M will be driven until the electrical signal feedback from the TACHOMETER, as filtered in the FILTER, is equal to the input to amplifier AMP. A4 from the error amplifier AMP. A3. This furnishes a MOTOR M speed control such that the rate of change of the VALVE V position is proportional to the error voltage developed in error amplifier AMP. A3 and input to amplifier AMP. A4.

Amplifier AMP. A3 is the temperature error amplifier, such as will balance three inputs together in order to give an output signal of 0 volts at equilibrium. This output signal of error amplifier AMP. A3 is the input signal to the motor control amplifiers AMP. A4 and AMP. A2, and at 0 volts, indicates that the system has reached stability. The temperature of the coolant in the RESERVOIR is monitored by a temperature sensor/transducer which absorbs one microampere current per degree Kelvin. In order to convert this current to degrees Centigrade, a calibrated current offset of 273.16 microamperes is applied as signal 0° K. TO 0° C. OFFSET in additive modification of signal SENSE WATER TEMPERATURE °K. as a first signal input to error amplifier AMP. A3. At 0° C., the currents from each of these two signals exactly balance each other. The combinatorial first current input of one microampere per degree Centigrade above 0° C. is converted to a voltage of 100 millivolts per degree Centigrade by a resistor. Any imbalance between the combinatorial first input signal of the SENSE WATER TEMPERATURE °K. as offset by signal 0° K. TO 0° C. OFFSET (which provides a 273.16° K. offset) and a second signal input of SET POINT TEMPERATURE will cause an output from error amplifier AMP. A3 which, as amplified in motor speed control amplifier AMP. A4 and AMP. A2, will cause MOTOR M to change the position of VALVE V (save that such imbalance is compensated for by the feedback from the POSITION POTENTIOMETER as will next be discussed).

Continuing in FIG. 3, the VALVE V and the HEAT EXCHANGER are both non-linear. Because of this, the coolant flow rate within the SECONDARY COOLANT LOOP and the resultant heat transfer occurring in the HEAT EXCHANGER will not be a linear function of the mechanical position of VALVE V. A POSITION POTENTIOMETER is mechanically connected to the shaft of VALVE V and provides a voltage output which changes with the mechanical position of VALVE V. This POSITION POTENTIOMETER output signal is modified in a NON-LINEAR COMPENSATOR in the form of a breakpoint amplifier, and input to error amplifier AMP. A3 in compensation for the combined non-linearities of the ELECTROMECHANICAL VALVE and HEAT EXCHANGER. As the VALVE V moves, a current from the POSITION POTENTIOMETER as compensated in the NON-LINEAR COMPENSATOR is added as a third input to error amplifier AMP. A3 in a direction to maintain approximately 4° C. higher temperature in the coolant than the set point.

Figure 5A:
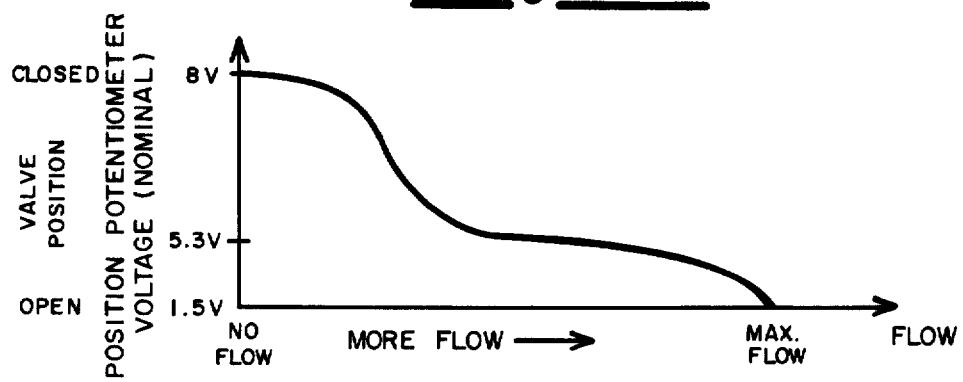
FIG. 5a shows the composite non-linear electromechanical valve and non-linear heat exchanger flow response to various positions of the electromechanical valve.
Figure 5B:
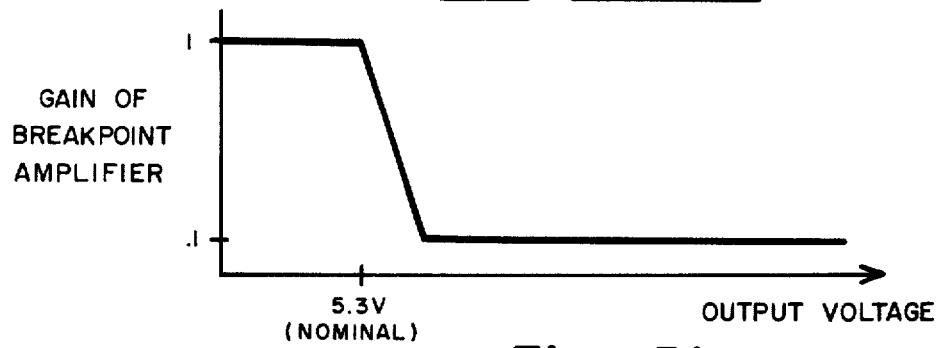

Continuing in the explanation of the ELECTROMECHANICAL VALVE control circuit of the present invention as block diagrammed in FIG. 3, there is an inherent and predictable difference between the SET POINT TEMPERATURE and the resultant temperature of the coolant within the RESERVOIR. This is caused by the finite gain and the ratios of the three currents utilized at the balancing input to error amplifier AMP. A3. If the voltage output of the POSITION POTENTIOMETER is a minimum of approximately 1.5 volts, then a small current is generated at the input to amplifier AMP. A3 which must be balanced by the voltage input of SET POINT TEMPERATURE and the voltage input of the signal SENSE WATER TEMPERATURE °K. as offset by the voltage 0° K. TO 0° C. OFFSET (corresponding to 273.16° K.). The voltage input to the error amplifier AMP. A3 from the POSITION POTENTIOMETER will be minimum when the ELECTROMECHANICAL VALVE is open, or maximum coolant flow is occurring within the SECONDARY COOLANT LOOP. At this point the NON-LINEAR COMPENSATOR has no effect—that is the signal gain is unitary as shown in FIG. 5b—because the change in coolant flow rate versus the position of VALVE V is linear. When it is required that the ELECTROMECHANICAL VALVE be partly or wholly closed, the POSITION POTENTIOMETER will output a non-zero voltage, which is converted in the NON-LINEAR COMPENSATOR into a non-zero current input at the error amplifier AMP. A3. For a nearly closed position of VALVE V, the coolant flow rate will change much more rapidly with valve position than for the nearly open valve position. Therefore the NON-LINEAR COMPENSATOR will utilize a lower signal gain—0.1 gain as shown in FIG. 5b—in order to reduce the effect of the voltage change from the POSITION POTENTIOMETER with the change in position of a nearly closed VALVE V. The net effect of the NON-LINEAR COMPENSATOR is to effectively flatten the non-linear voltage versus flow (equivalently voltage versus thermal exchange) response curve of the POSITION POTENTIOMETER mechanically linked to the non-linear ELECTROMECHANICAL VALVE.

The effect of this current feedback from the NON-LINEAR COMPENSATOR is to subtract from the net current resultant from the output of the temperature sensor/transducer within the RESERVOIR, and equilibrium in the current inputs to amplifier AMP. A3 will be reached with a higher coolant temperature within the RESERVOIR than if no voltage had been produced by the POSITION POTENTIOMETER (which is mechanically linked to the position of the VALVE V of the ELECTROMECHANICAL VALVE). The absolute maximum voltage output from the POSITION POTENTIOMETER, and the resultant current at error amplifier AMP. A3, will occur when the VALVE V of the ELECTROMECHANICAL VALVE is closed. This current will be equivalent to 6° C. To operate with the VALVE V within the SECONDARY COOLANT LOOP closed would mean that no thermal exchange is transpiring within such SECONDARY COOLANT LOOP, such as would basically occur when the coolant temperature with the RESERVOIR is in temperature equilibrium with the SET POINT TEMPERATURE. Such temperature equilibrium normally means that the LOGIC MODULES are off, and are not dissipating heat in the PRIMARY COOLANT LOOP. The design of the cooling system shown in FIG. 3 is such that the VALVE V will be open at least one-third when there is maximum heat dissipation within the PRIMARY COOLANT LOOP (the LOGIC MODULES are fully powered-on), thereby requiring some thermal exchange to transpire within the SECONDARY COOLANT LOOP. The feedback voltage signal from POSITION POTENTIOMETER occurring when the VALVE V of the ELECTROMECHANICAL VALVE is one-third open is converted to a current input to error amplifier AMP. A3 equivalent to 4° C. This is the nominal increase in the maintained, operating, temperature above the set point temperature.

Figure 4:
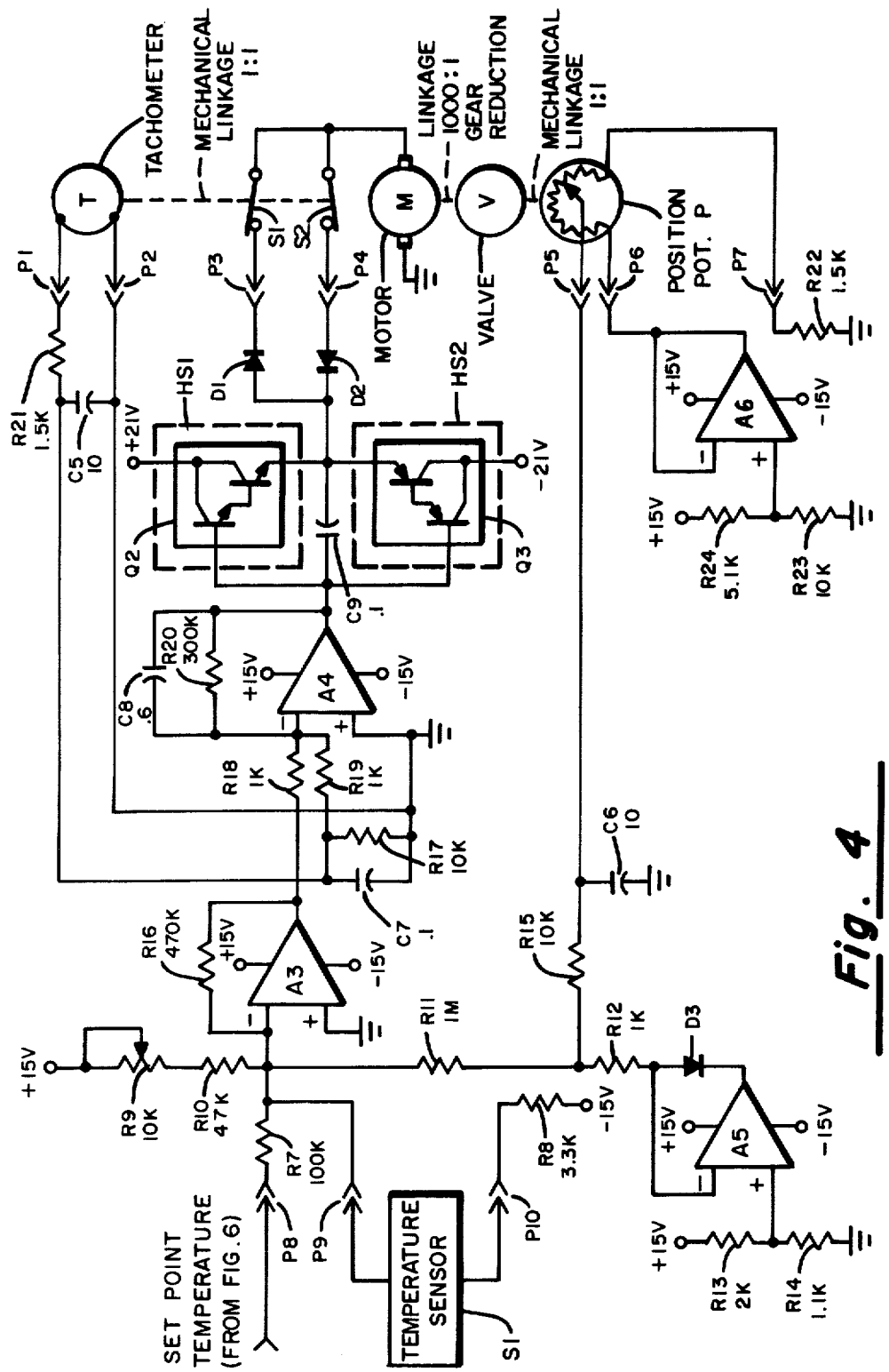
FIG. 4 shows a schematic diagram of the circuit of the present invention for controlling coolant flow to a non-linear heat exchanger through a non-linear electromechanical valve.

The detailed schematic of the ELECTROMECHANICAL VALVE control circuit of the present invention is shown in FIG. 4. All resistances shown are in ohms and all capacitances shown are in microfarads. The circuit elements shown in FIG. 4 may be momentarily compared with the block diagram of FIG. 3. The MOTOR M, the valve POSITION POTENTIOMETER P and the TACHOMETER T are in one unit mounted for control of VALVE V, such unit as is mounted outside the control board upon which the present circuit is normally mounted. Also mounted on this ELECTROMECHANICAL VALVE and POSITION POTENTIOMETER and TACHOMETER assembly are mechanical limit switches S1 and S2. Diodes D1, and D2, types PWR IF 5A BV-100V, are respectively in series with limit switches S1 and S2 in order to allow the motor to stop when one direction of travel is exceeded and still be able to move in the opposite rotation. The ELECTROMECHANICAL VALVE is of the type "Electrically Actuated Ball Valve with Actuator and Manual Override" available from G. F. Plastics Systems, Inc., 2882 Dow Avenue, Tustin, California 92680.

Continuing in FIG. 4, the valve POSITION POTENTIOMETER is connected from resistor R22 type fixed film 0.25W 2% nominally 1.5 Kohms, to the output of amplifier A6, integrated circuit operational amplifier type 741. This output of amplifier A6 is nominally fixedly held at +10 volts as determined by the resistive divider between +15 volts and ground consisting of resister R24, type fixed film 0.25W 2% 5.1 Kohms, and resistor R23, type fixed film 0.25W 2% 10 Kohms. In this way the correct voltage is created on the wiper of the POSITION POTENTIOMETER when the VALVE V (reference FIG. 3) is fully open. The wiper of the POSITION POTENTIOMETER is connected to resistor R15, type fixed film 0.25W 2% 10 Kohms, and filtered by capacitor C6, type fixed tantalum dielectric 35V 20% 10 microfarads. All such external electrical connections to the ELECTROMECHANICAL VALVE control circuit are through a connector, indicated as plug jacks P1 through P7.

The ELECTROMECHANICAL VALVE control circuit of the present invention as schematically diagrammed in FIG. 4 accounts for the non-linear coolant flow rate within the SECONDARY COOLANT LOOP (reference FIG. 3) with the position of VALVE V (reference FIG. 3), and also the non-linear thermal transfer occurring within the HEAT EXCHANGER (reference FIG. 3) with coolant flow rate. The combined non-linearities of the ELECTROMECHANICAL VALVE and the HEAT EXCHANGER (reference FIG. 3) are approximately as shown in FIG. 5a. The response of the valve POSITION POTENTIOMETER, nominally 1.5 volts for an open valve through 8 volts for a closed valve, is plotted for zero (no) flow through maximum flow in FIG. 5a. Slightly more difficult to conceptualize, the curve shown in FIG. 5a is also typical of the voltage response of the valve POSITION POTENTIOMETER with the overall thermal transfer occurring within the SECONDARY COOLANT LOOP (reference FIG. 3), such thermal transfer as is not precisely linear with the coolant flow rate due to the non-linearity of the HEAT EXCHANGER (reference FIG. 3). In a similar manner to the non-linearity of the HEAT EXCHANGER (reference FIG. 3), variations in the external thermal transfer media (the BUILDING WATER shown in FIG. 3) will also affect the thermal transfer rate with coolant flow within the SECONDARY COOLANT LOOP (reference FIG. 3). The curve shown in FIG. 5a is thusly typical of a family of such curves as represent the combined non-linear thermal transfer within the SECONDARY COOLANT LOOP (reference FIG. 3) when thermal heat exchange to such SECONDARY COOLANT LOOP is conducted with an external thermal exchange media (the BUILDING WATER shown in FIG. 3) which varies in temperature and flow rate (pressure) and via a HEAT EXCHANGER which is non-linear.

Figure 5C:
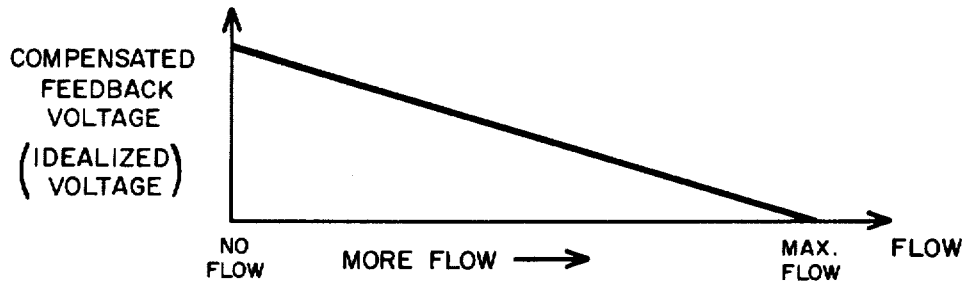
FIG. 5c shows the idealized composite linear coolant flow and smooth cooling capacity, obtained by the circuit of the present invention, relative to the position of the electromechanical valve.

Continuing in FIG. 4 with momentary reference to FIG. 5a, without electrical compensation the feedback of that voltage developed in the wiper of the POSITION POTENTIOMETER would be radically different between an open (maximum) flow ELECTROMECHANICAL VALVE and a closed ELECTROMECHANICAL VALVE. In order to linearize the feedback response derived from the wiper of the POSITION POTENTIOMETER, breakpoint amplifier exhibiting the gain response shown in FIG. 5b, and consisting of amplifier A5 is biased by resistors R13, type fixed film 25W 2% 2K, and R14, type fixed film 0.25W 2% 1.1 Kohms, to be 5.30 volts, corresponding to the voltage output of the wiper of the POSITION POTENTIOMETER at approximately the knee of the response curve shown in FIG. 5a. Considering the breakpoint amplifier response curve shown in FIG. 5b, if the voltage applied by the wiper of the POSITION POTENTI- OMETER is less than 5.30 volts, then the positive input to differential operational amplifier A5 will be of greater magnitude than the negative input, and the resultant positive output signal will reverse bias diode D3, type PWR IF 200 MA BV-30V IN914. Resultantly, for feedback voltages from the wiper of the POSITION POTENTIOMETER less than 5.30 volts, the offset differential operational amplifier A5 and surrounding circuitry will be without effect on such signal. For a feedback signal from the wiper of the POSITION POTENTIOMETER greater than 5.30 volts, the output of the differential operational amplifier A5 will forward bias D3, clamping the negative input signal from the wiper of the POSITION POTENTIOMETER to be closed to the positive input signal resultant from the resistive divider of R13 and R14, thereby holding the end of resistor R12, type fixed film 0.25W 2% 1 Kohms, connected to diode D3 to be at 5.30 volts. As the signal produced by the wiper of the valve POSITION POTENTIOMETER goes more positive than 5.30 volts (valve is closing) the signal seen as the negative input to error operational amplifier A3 is reduced by the voltage divider consiting of resistances R15, type fixed film 0.25W 2% 10 Kohms, and R12 to about one-tenth of the original voltage value. This breakpoint amplifier compensates for the steep slope of the response shown in FIG. 5a, thereby making the response to a closed valve nearly the same as that for an open valve. The exact biasing and knee point of a breakpoint amplifier scheme in compensation for the non-linearity within the SECONDARY COOLANT LOOP (shown in FIG. 3) is, of course, a function of such non-linearities. The resultant compensation obtained by the breakpoint amplifier shown in FIG. 4 is approximately smooth, linear, relationship of thermal cooling capacity change versus valve POSITION POTENTIOMETER output voltage as shown in FIG. 5c. The breakpoint amplifier, or other NON-LINEAR COMPENSATOR means (shown in FIG. 3), is applied to the feedback signal derived from the POSITION POTENTIOMETER in order to compensate for the non-linearity of thermal transfer with coolant flow rate occurring within the SECONDARY COOLANT LOOP (shown in FIG. 3). Returning to FIG. 4, the voltage that is obtained from the compensated feedback arising from the POSITION POTENTIOMETER is converted into current for input to error differential operational amplifier A3 by resistance R11, type fixed film 0.25W 2% 1 megohm.

Continuing in FIG. 4, the TEMPERATURE SENSOR S1, which is the temperature sensor of the coolant within the RESERVOIR (shown in FIG. 3), is mounted externally to the ELECTROMECHANICAL VALVE control circuit of the present invention. Connection to such control circuitry, normally located upon a single card, is normally through pluggable connections such as plug jacks P9 and P10. The TEMPERATURE SENSOR S1 is a temperature to current sensor/transducer which rejects voltage noise. This TEMPERATURE SENSOR S1, type AD 590L available from Analog Devices, Inc., produces one microampere per degree Kelvin. This transducer current output determines the values of an input current and feedback resistances as relate to error operational amplifier A3. To facilitate the calibration and debugging of the ELECTROMECHANICAL VALVE control circuit, resistance R8, type fixed film 0.25W 2% 3.3 Kohms, which connects the TEMPERATURE SENSOR S1 to voltage supply −15 volts is incorporated upon the same card as the ELECTROMECHANICAL VALVE control circuit in order to allow monitoring of the output of TEMPERATURE SENSOR S1 without disturbing the functioning of the control circuit.

The present ELECTROMECHANICAL VALVE control circuit is arbitrarily calibrated, in consideration of the utilization of the overall cooling system as shown in FIG. 3, so that 0° C. is defined as 0 volts from the SET POINT TEMPERATURE input signal. The SET POINT TEMPERATURE input signal will vary 100 millivolts per degree Centigrade above this minimum of 0 volts equals 0° C. A circuit such as may determine the SET POINT TEMPERATURE input signal in accordance with either of two external reference signals, a manually settable trim pot, or a fixed high limit will be shown in FIG. 6. Such a SET POINT TEMPERATURE input signal is normally pluggably connected to the ELECTROMECHANICAL VALVE control circuit shown in FIG. 4, for example through plug jack P8. Resistance R7, type fixed film 0.25W 2% 100 Kohms, is utilized to convert the 100 millivolts per degree SET POINT TEMPERATURE signal to one microampere per degree Centigrade current for input to differential operational amplifier A3.

Resistances R9, type variable wire-wound 0.5W 5% 10 Kohms linear, and R10, type fixed film 0.25W 2% 47 Kohms, as connected to the voltage supply +15 volts, provide the final signal input to error operational amplifier A3. Resistances R10 and adjustable resistance R9 are adjusted to provide a degrees Kelvin to degrees Centigrade (0° K. to 0° C. OFFSET signal shown in FIG. 3) conversion for the signal received from TEMPERATURE SENSOR S1 which senses the coolant within the RESERVOIR (shown in FIG. 3). The calibrated current offset obtained through resistances R9 and R10 is thusly 273.16 microamperes which is added to the signal input to error operational amplifier A3.

Continuing in FIG. 4, integrated circuit operational amplifier A3, type 741, serves as the error amplifier for the present ELECTROMECHANICAL VALVE control circuit. Resistance R16, type fixed film 0.25W 2% 470 Kohms, is a feedback resistor for such error amplifier A3. The output voltage from error amplifier A3 is determined by the following equation:

SET POINT TEMPERATURE (degrees Centigrade)—TEMPERATURE SENSOR S1 (RESERVOIR temperature in degrees Kelvin)—273.16 MICROAMPERES (offset obtained from resistances R9 and R10)=ELECTROMECHANICAL VALVE position (derived from POSITION POTENTIOMETER as modified by NON-LINEAR COMPENSATOR).

Thusly the RESERVOIR temperature will always be above the SET POINT TEMPERATURE by the amount of current provided from valve POSITION POTENTIOMETER as modified in the NON-LINEAR COMPENSATOR breakpoint amplifier consisting of operational amplifier A5 and surrounding circuitry.

The signal output of error amplifier A3 changes by 0.47 volts per microampere of input current change to operation amplifier A3, or 0.47 volts output per degree Centigrade input. This output signal from error amplifier A3 drives the motor control amplifier A4, integrated circuit operational amplifier type 741, through the resistor R18, type fixed film 0.25W 2% 1 Kohms. When the speed of MOTOR M is 0, there is no signal output from TACHOMETER T, and the current received at motor control amplifier A4 is converted into an output voltage equal to (0.47/1K) times 300K equals 141 volts. This gain is established by feedback resistor R20, type fixed film 0.25W 2% 300 Kohms in parallel with filter capacitance C8, type fixed plastic dielectric 50V 20% 0.6 microfarads. The motor control operational amplifier A4 will, of course, saturate at approximately 13 volts output signal. This motor control operational amplifier A4 is, additionally, capable of sourcing only up to approximately 25 millimperes whereas the MOTOR M may require approximately 7 amperes starting current.

Continuing in FIG. 4, the Darlington transistors Q2, type NPN VCEO 100V 150W BETA 1K, and Q3, type PNP VCEO 100V 150W BETA 1k are utilized to buffer the output of motor control operational amplifier A4 to a maximum current of 1,000 (gain) times 0.025 amperes or 25 amperes, which is more than adequate to start the electromechanical valve MOTOR M. Considering again that the motor control operational amplifier A4 will saturate at approximately 13 volts output signal, the maximum temperature change necessary to guarantee full drive voltage to the electromechanical valve MOTOR M is 13.0 divided by 300 times 0.47 equals 0.09° C. The MOTOR M will stop turning with applied drive voltage of approximately 2 volts. When the forward voltage drop of power diode D1 (or D2, types PWR IO 3 ampere BV+ 200V SS2111) and Darlington transistor Q2 (or Q3), is added then a stop voltage of 2 volts plus 1 volt plus 2 volts, or 5 volts is obtained. This minimum MOTOR M drive voltage represents a temperature error, due to the gain of motor control amplifier A4, of 0.035° C. This error is insignificant compared to the offset in the valve POSITION POTENTIOMETER.

When the MOTOR M begins to turn, the mechanically linked TA-CHOMETER T begins to output a d.c. voltage which is received at motor control amplifier A4 in opposition to the drive voltage resultant from error amplifier A3. This direct current feedback signal is received through resistances R21, type fixed film 0.25W 2% 1.5 Kohms, and R19, type fixed film 0.25W 2% 1 Kohms. This direct current signal is filtered both by capacitor C5, type fixed tantalum dielectric 35V 20% 10 microfarads (which is located very close to plug jack connection P1 and P2) as well as by a resistive capacitive filter comprised of resistance R17, type fixed film 0.25W 2% 10 Kohms, and capacitance C7, type fixed tantalum dielectric 35V 20% 0.1 microfarads. The feedback loop derived from TACHOMETER T prevents the saturated operation of amplifier A4 which would otherwise result in the rapid opening and closing of the ELECTROMECHANICAL VALVE with only a 0.1° C. shift in the temperature input derived from TEMPERATURE SENSOR S1.

Continuing in FIG. 4, additional circuit elements resistance R20, type fixed film 0.25W 2% 300 Kohms and capacitance C8, type fixed plastic dielectric 50V 20%, 0.6 microfarads, comprise a feedback loop for operational amplifier A4, type 741. Capacitor C9, type fixed ceramic dielectric 50V 20% 0.1 microfarad, serves as a filter capacitor to the Darlington transistors Q2 and Q3. The Darlington transistors Q2 and Q3 are mounted on electronic component heat sinks HS1 and HS2, approximately 3.34 inches by 2.80 inches by 1.33 inches. The Darlington transistors Q2 and Q3 are connected, as indicated, between power of +21 volts d.c. and −21 volts d.c.

In summary, the operation of the present circuit for the control of an ELECTROMECHANICAL VALVE as shown in FIG. 3 is straightforward. The utilization of a feedback signal derived from a POSITION POTENTIOMETER responsive to the valve position allows, through compensation in a NON-LINEAR COMPENSATOR consisting of a breakpoint amplifier, the valve control circuit to be responsive to non-linearities in the SECONDARY COOLANT LOOP. A key to the stable operation of the valve control circuit lies in the use of a feedback loop from the TACHOMETER to force the rate of change in valve position to be proporational to error temperature and to allow a feedback from the POSITION POTENTIOMETER equivalent in magnitude to approximately 4° C. to result in circuit stability. Referring to FIG. 3, the control obtained by the present ELECTROMECHANICAL VALVE control circuit is independent of the thermal load emplaced by the LOGIC MODULES upon the PRIMARY COOLANT LOOP. The control obtained by the present electromechanical valve circuit is also independent of the flow rate or pressure of the thermal exchange media of the BUILDING WATER, and of the flow rate within the SECONDARY COOLANT LOOP. For operation of the present circuit, it is sufficient only that the flow rate within the SECONDARY COOLANT LOOP not change at a position of VALVE V, part of the ELECTROMECHANICAL VALVE, and that the thermal properties of the HEAT EXCHANGER should not change for a given flow rate within the SECONDARY COOLANT LOOP. Of course, the thermal transfer within the HEAT EXCHANGER is non-linear with differing flow rates within the SECONDARY COOLANT LOOP.

The actual performance of the present circuit for the control of an ELECTROMECHANICAL VALVE was obtained for various permutations and combinations of thermal heat load, set point temperature, and flow rates of the thermal exchange media (BUILDING WATER). The load applied to the PRIMARY COOLANT LOOP was varied from 0 kilowatts to 20 kilowatts. The SET POINT TEMPERATURE was varied from 35° F. to 100° F. The flow rate of the external thread exchange media of the BUILDING WATER was varied from a minimum flow of 20 to a full flow of approximately 30 gallons per minute. The RESERVOIR contained approximately 25 gallons of coolant water, with approximately 20 gallons circulating within the SECONDARY COOLANT LOOP and 10 gallons circulating within the PRIMARY COOLANT LOOP. In permutations and variations of the above parameters, the worst case change in regulated temperature with essentially instantaneous alterations of one or more conditions was 2.8° C. A typical response to a full transient change in the thermal load of the PRIMARY COOLANT LOOP from 0 kilowatts to 20 kilowatts produces a net change in the coolant temperature within the RESERVOIR of less than 2° C.

Figure 6:
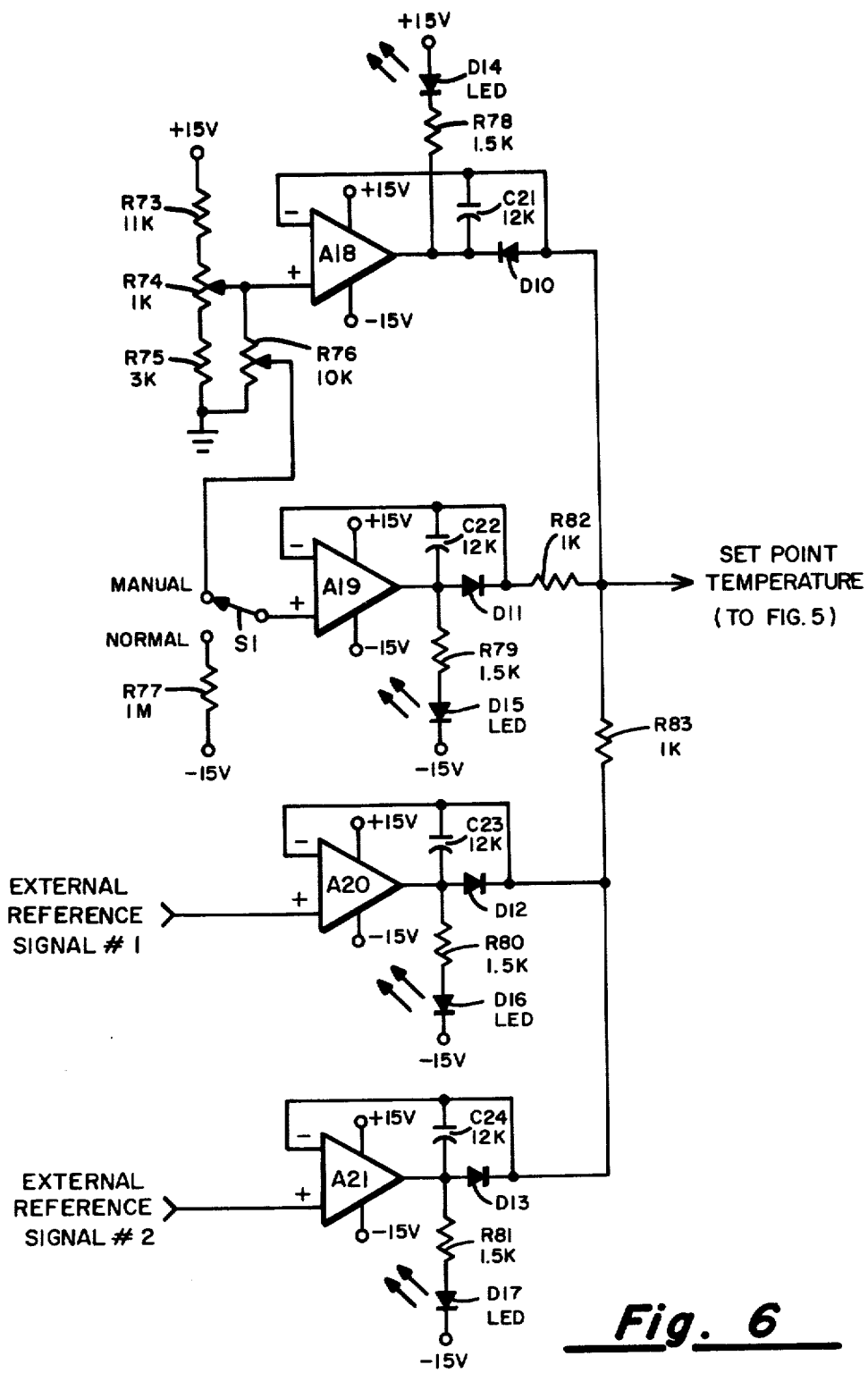
FIG. 6 shows a schematic diagram of a circuit for providing a set point temperature input signal to the electromechanical valve control circuit of FIG. 4.

A circuit which selects the SET POINT TEMPERATURE signal input as utilized in the ELECTROMECHANICAL VALVE control circuit shown in FIG. 4, is shown in schematic diagram in FIG. 6. This circuit allows the SET POINT TEMPERATURE signal input to the valve control circuit to be selected as one of two external reference signals normally associated with two dew points by a manually settable variable potentiometer, or by a high temperature limit in case an external reference signal fails. The selection between the manual and the external references, dew point, control is made by the toggle switch S1, type single pole, double throw. The maximum allowable temperature corresponding to the maximum allowable SET POINT TEMPERATURE signal output is determined by a calibrated voltage clamp which always has precedence over any other manual or automated operational mode. The circuit shown in FIG. 6 performs analog gating to select which of four possible temperature related voltages will be applied as signal SET POINT TEMPERATURE to the valve control circuit shown in FIG. 4.

Continuing in FIG. 6, operational amplifier A18, type 741, and surrounding circuitry constitute the maximum temperature clamp. If the voltage at the anode of diode D10, type SIGNAL IF 200MA BV30V IN914, and hence the negative voltage input to operational amplifier A18, is less than a maximum set point voltage value on resistor R79, then operational amplifier A18 will reverse bias diode D10 by pulling its cathode up to the positive +15 volts supply, and also turn indicator light emitting diode D14, type 3V RVS V 40MA continuous forward current "off." As soon as any other input signal should attempt to drive the SET POINT TEMPERATURE signal as connects to the anode of diode D10 above a maximum set point voltage value, then operational amplifier A18 will clamp it by forward biasing diode D10. At the same time light emitting diode D14 will be turned "on" to show that the maximum set temperature has been reached. The maximum SET POINT TEMPERATURE voltage value is determined by the positive input to operational amplifier A18 as derived from the voltage divider consisting of resistances R73, type fixed film 0.25W 2% 11 Kohms, variable resistance R79, type 0.5W 10% 1 Kohms linear, and resistance R75, type fixed film 0.25W 2% 3 Kohms.

In the NORMAL operational mode wherein the SET POINT TEMPERATURE is derived from one of two external reference dew point monitor signals, the positive input to operational amplifier A18 is pulled to the negative, −15 volt, supply, thereby forcing operational amplifier A19, type 741, to output to the negative −15 volt supply, thereby reverse biasing diode D11, type SIGNAL IF 200MA BV 30V IN914, and holding light emitting diode D15, type 3V RVS V 40MA continuous forward current, in the "off", or non-conducting condition. When the switch S1 is placed in the MANUAL mode, the signal output of operational amplifier A19 forward biases diode D11, and through resistances R82, type fixed film 0.25 2% 1 Kohms, and R83, type fixed film 0.25W 2% 1 Kohms, reverse biases both diodes D12 and D13, types SIGNAL IF 200MA BV 30V IN914 causing both dew point signal inputs as derived from operational amplifiers A20 and A21 to be deactivated. In this manual state, neither light emitting diode D16 nor light emitting diode D17, types 3V RVS V 40MA continuous forward current, as are respectively associated with the first and second external reference dew point signals inputs, will be on.

The manual establishment of signal SET POINT TEMPERATURE is accomplished through operational amplifier A19, type 741. The maximum value of this manually settable voltage, corresponding to a maximum temperature, is that voltage, and corresponding temperature, as established by the maximum temperature clamp circuit utilizing operational amplifier A18. This is because the positive input to operational amplifier A19 may be switch connected in the MANUAL switch position to the top of variable resistance (potentiometer) R76 type 0.5W 10% 10 Kohms linear. The lowest voltage to which the positive input of operational amplifier A19 may be connected via switch S1 and variable resistance R76 is ground, or 0° C. (freezing temperature of water).

Continuing in FIG. 6, the lowest value of the SET POINT TEMPERATURE signal will be the higher of either the maximum allowable temperature as established by operational amplifier A19 and associated circuitry, or the higher of the two dew point monitor signals respectively derived from two external reference signals in operational amplifiers A20 and A21 and associated circuitry. This is because resistor R82, type fixed film 0.25W 2% 1 Kohms, is connected to resistor R83, type film 0.25W 2% 1 Kohms. If an attempt is made, via adjustment of variable resistance R76, to lower the signal output from operational amplifier A19 below that signal arising from the dew point monitor amplifiers A20 and A21 then diode D12 or D13, types SIGNAL IF 200MA BV 30V IN914, will be forward biased and, in turn, will reverse bias diode D11, type SIGNAL IF 200MA BV 30V IN914 thereby forcing the operational amplifier A19 signal output to go to the negative supply, −15 volt, voltage. In such a case the manual indicator light emitting diode D15, type 3V RVS V 40MA continuous forward current, will be turned off. In this manner, the manual adjustment range of variable resistor R76 as connects to switch S1 to operational amplifier A19 is limited to be between the dew point signal, the highest signal output of either of the dew point monitor operational amplifiers A20 or A21, and that maximum allowable module temperature established by operational amplifier A18.

The higher of two dew point signals as represented by the voltage level of EXTERNAL REFERENCE SIGNAL #1 received by operational amplifier A20 and EXTERNAL REFERENCE SIGNAL #2 as received by operational amplifier A21 is utilized as the controlling dew point signal. The higher of such referenced dew point signals is utilized since it is possible to have different dew points arising in different ones of the LOGIC MODULES as illustrated in the cooling system of FIG. 3. The warmer such dew point, corresponding to the higher voltage of EXTERNAL REFERENCE SIGNAL #1 or EXTERNAL REFERENCE SIGNAL #2 must be utilized in order to prevent the condensation of moisture in the LOGIC MODULE of the higher dew point. The operational amplifiers A20 and A21, types 741, are utilized in a similar manner to operational amplifiers A18 and A19, that is, as operational diodes with zero forward bias voltage and zero resistance with very high reverse bias resistance. If the EXTERNAL REFERENCE SIGNAL #1 received by operational amplifier A20 is more positive than EXTERNAL REFERENCE SIGNAL #2 received by operational amplifier A21, then operational amplifier A20's signal output will forward bias diode D12, which in turn reverse biases diode D13 (both diodes type SIGNAL IF 200MA BV 30V IN014). When operational amplifier A20 is providing an active signal output, light emitting diode D16, type 3V RVS 40MA continuous forward current, is "on" showing that the dew point monitor is functioning. Similarly, operational amplifier A21 operates in a similar manner to reverse bias diode D12 if the EXTERNAL REFERENCE SIGNAL #2 is higher than EXTERNAL REFERENCE SIGNAL #1. The calibration of all operational amplifiers shown in FIG. 6 is for a unitary signal gain.

The total losses in an error in any part of such circuitry is less than 10 millivolts, corresponding to less than 0.1° C. error in the output SET POINT TEMPERATURE signal.

In summary, the SET POINT TEMPERATURE input circuit schematically shown in FIG. 6, shows how the signal SET POINT TEMPERATURE may be derived by one of two external reference signals, by a manually settable variable potentiometer, or by a high temperature limit in case a dew point monitor providing an external reference signal fails. Such signal SET POINT TEMPERATURE is utilized as a reference input to the ELECTROMECHANICAL VALVE control circuit shown in FIG. 4.

While a specific preferred embodiment of the invention of an ELECTROMECHANICAL VALVE control circuit has been described, it will be understood that the basic principles of the invention may be utilized in an alternative manner. For example, the non-linear compensator shown in FIG. 3 need not comprise a breakpoint amplifier, but can be a more complex electronic circuit as even more perfectly represents the combined non-linearities of the ELECTROMECHANICAL VALVE and the HEAT EXCHANGER present within the SECONDARY COOLANT LOOP. For example, the present circuit incorporating all POSITION POTENTIOMETER and all TACHOMETER signal feedback loops, in conjunction with the SET POINT TEMPERATURE and the SENSE WATER TEMPERATURE °K. (as offset) signals, could be calibrated and adapted for operation in alternative temperature ranges than 0° C. to 100° C. and for alternative system coolants other than water.

The embodiments of the invention in which an exclusive property or privilege is claimed are defined as follows:

I claim:

1. In a thermal exchange coolant loop wherein coolant from a reservoir is pumped as regulated by the position of an electromechanical valve, through a heat exchanger for heat transfer, an electrical control circuit for said electromechanical valve to the end that the temperature of said coolant within said reservoir may be essentially maintained, via said heat transfer, at a reference constant, set point, temperature level as determined by an externally supplied signal, said electromechanical valve control circuit comprising;
    position potentiometer means for providing a linear position signal output responsively to the position of said electromechanical valve;
    non-linear compensator means responsive to said position signal output of said position potentiometer means for deriving a heat transfer signal output which is approximately linear with the coolant flow controlled by said electromechanical valve;
    temperature sensor means for providing a temperature signal output, essentially linear over a temperature range, responsively to the temperature of said coolant within said reservoir;
    differential amplifier means for receiving said heat transfer signal output from said non-linear compensator means, said temperature signal output from said temperature sensor means, and said externally supplied signal which corresponds to said reference constant, set point, temperature level and for producing an error signal which is the difference between said ((externally supplied, set point temperature signal) minus (temperature signal)) and said (heat transfer signal);
    drive amplifier means for producing a positioning drive signal to said electromechanical valve responsively to said error signal from said differential amplifier means.

2. The electromechanical valve control circuit of claim 1 which further comprises:
    tachometer sensor means for producing a velocity signal responsive to the rate of change in position of said electromechanical valve;
    and wherein said drive amplifier means further comprise:
    drive amplifier means for producing a positioning drive signal to said electromechanical valve responsively to said error signal from said differential amplifier means as diminished, or opposed, by said velocity signal from said tachometer sensor means.

3. The electromechanical valve control circuit of claim 1 or claim 2 which further comprises
    offset signal generating means for providing a constant offset signal level which is combined with said temperature signal;
    whereby when said temperature signal is in units of voltage per degree Kelvin temperature of said coolant in said reservoir, then said constant offset signal level when equivalent to 273.16 degrees Kelvin produces, when combined with said temperature signal, a combined signal which is in units of voltage per degree Centigrade temperature above zero degrees Centigrade;
    whereby said constant offset signal combined with said temperature signal adds a constant signal to that combination of signals as are utilized in production of said error signal by said differential amplifier means.

4. The electromechanical valve control circuit of claim 1 or claim 2 wherein said non-linear compensator means further comprise:
    a breakpoint amplifier means for producing a first signal gain responsively to said linear position signal as reflects a first range of positions of said electromechanical valve, and for producing a second signal gain responsively to said linear position signal as reflects a second range of positions of said electromechanical valve.

5. The electromechanical valve control of claim 1 or claim 2 wherein said temperature sensor means are further defined as
    temperature sensor means for providing a temperature signal output essentially linear over the temperature range of 0° C. to 100° C. responsively to the temperature of a water coolant within said reservoir.

* * * * *